US010814439B2

United States Patent
Ozturk et al.

(10) Patent No.: US 10,814,439 B2
(45) Date of Patent: Oct. 27, 2020

(54) TURBOMACHINE REPAIR USING ADDITIVE MANUFACTURING

(71) Applicant: General Electric Company, Schenectady, NY (US)

(72) Inventors: Yusuf Eren Ozturk, Istanbul (TR); Steven Charles Woods, Easley, SC (US); Onur Onder, Istanbul (TR); Mustafa Yuvalaklioglu, Kartepe (TR); Birol Turan, Istanbul (TR)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 15/993,853

(22) Filed: May 31, 2018

(65) Prior Publication Data

US 2019/0366491 A1 Dec. 5, 2019

(51) Int. Cl.
| | |
|---|---|
| *B23P 6/00* | (2006.01) |
| *B23K 26/082* | (2014.01) |
| *B22F 3/105* | (2006.01) |
| *B33Y 10/00* | (2015.01) |
| *B33Y 30/00* | (2015.01) |
| *B33Y 50/02* | (2015.01) |
| *B33Y 80/00* | (2015.01) |

(52) U.S. Cl.
CPC ............ *B23P 6/007* (2013.01); *B22F 3/1055* (2013.01); *B23K 26/082* (2015.10); *B22F 2003/1057* (2013.01); *B22F 2003/1058* (2013.01); *B33Y 10/00* (2014.12); *B33Y 30/00* (2014.12); *B33Y 50/02* (2014.12); *B33Y 80/00* (2014.12)

(58) Field of Classification Search
CPC ...... B23P 6/007; B23K 26/082; B22F 3/1055; B22F 2003/1057; B22F 2003/1058; B33Y 10/00; B33Y 30/00; B33Y 50/02; B33Y 80/00
USPC ......................................................... 700/212
See application file for complete search history.

(56) References Cited

U.S. PATENT DOCUMENTS

| | | | |
|---|---|---|---|
| 4,998,005 A | 3/1991 | Rathi | |
| 5,913,555 A | 6/1999 | Richter | |
| 6,492,651 B2 * | 12/2002 | Kerekes | ................ B22F 3/1055 250/559.2 |

(Continued)

*Primary Examiner* — Robert E Fennema
*Assistant Examiner* — Christopher W Carter
(74) *Attorney, Agent, or Firm* — James Pemrick; Hoffman Warnick LLC

(57) ABSTRACT

A system includes a mounting plate having a plurality of reference members, an inspection system having a profiler device, and an additive manufacturing machine operatively coupled with the inspection system. A computer device scans the mounting plate with the profiler device to obtain position and orientation of the reference members and position and top surface profile data of any parts located on the mounting plate. A transmitting step transmits reference member position and orientation and part position and top surface profile data to the additive manufacturing machine. A detecting step detects mounting plate orientation and position inside the additive manufacturing machine. A combining step combines mounting plate orientation/position inside of the additive manufacturing machine and part position and top surface profile data to calculate a build path program for the additive manufacturing machine. A performing step performs a build process using the build path program to repair the parts.

18 Claims, 5 Drawing Sheets

(56) References Cited

U.S. PATENT DOCUMENTS

| | | |
|---|---|---|
| 8,140,179 B2 | 3/2012 | Drechsler |
| 9,174,312 B2 | 11/2015 | Baughman |
| 9,835,568 B2 | 12/2017 | Woods |
| 2005/0102060 A1* | 5/2005 | Watanabe .............. B25J 9/1697 700/245 |
| 2014/0361460 A1* | 12/2014 | Mark ................... B29C 70/523 264/248 |
| 2015/0132127 A1 | 5/2015 | Salm |

* cited by examiner

TURBOMACHINE REPAIR USING ADDITIVE MANUFACTURING

BACKGROUND OF THE INVENTION

The disclosure relates generally to additive manufacturing, and more particularly, to a method for repairing machine parts using additive manufacturing based on defects identified using profile scanning or positional data capturing.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object.

Additive manufacturing techniques typically include taking a three-dimensional computer aided design (CAD) file of the object to be formed that includes an intended three-dimensional (3D) model or rendering of the object. The intended 3D model can be created in a CAD system, or the intended 3D model can be formulated from imaging (e.g., computed tomography (CT) scanning) of a prototype of an object to be used to make a copy of the object or used to make an ancillary object (e.g., mouth guard from teeth molding) by additive manufacturing. In any event, the intended 3D model is electronically sliced into layers, e.g., 15 to 100 micrometers thick, creating a file with a two-dimensional image of each layer. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed to create the object.

In metal powder additive manufacturing techniques, such as selective laser melting (SLM) and direct metal laser melting (DMLM), metal powder layers are sequentially melted together to form the object. More specifically, fine metal powder layers are sequentially melted after being uniformly distributed using an applicator on a metal powder bed. The metal powder bed can be moved in a vertical axis. The process takes place in a processing chamber having a precisely controlled atmosphere of inert gas, e.g., argon or nitrogen. Once each layer is created, each two-dimensional slice of the object geometry can be fused by selectively melting the metal powder. The melting may be performed by a high-powered laser such as a 100 Watt ytterbium laser to fully weld (melt) the metal powder to form a solid metal. The laser moves in the X-Y direction using scanning mirrors, and has an intensity sufficient to fully weld (melt) the metal powder to form a solid metal. The metal powder bed is lowered for each subsequent two-dimensional layer, and the process repeats until the three-dimensional object is completely formed.

In many additive manufacturing techniques, the layers are created following the instructions provided in the intended 3D model and use material either in a molten form or in a form that is caused to melt to create a melt pool. Each layer eventually cools to form a solid object. A similar process can be used to repair parts. A part is scanned and then a repair plan is calculated. However, incorporating high precision scanners inside additive manufacturing machines is difficult (due to space constraints), and scanning outside of the additive manufacturing machine presents problems when the part is moved inside the additive manufacturing machine, as the position and/or orientation of the part will most likely change. Slight changes in part location can result in unsatisfactory repair processes, as the new, repaired layers do not align with the unrepaired portions of the part. In addition, only one part may be repaired at a time, so the repair process is very slow and time consuming.

BRIEF DESCRIPTION OF THE INVENTION

In a first aspect, a system includes a mounting plate having a plurality of reference members, an inspection system having a profiler device, and an additive manufacturing machine operatively coupled with the inspection system. A computer device is configured to perform the steps of scanning the mounting plate with the profiler device to obtain position and orientation of the reference members and position and top surface profile data of any parts located on the mounting plate. A transmitting step transmits the position and orientation of the reference members and the position and top surface profile data of the parts to the additive manufacturing machine. A detecting step detects orientation and position of the mounting plate inside of the additive manufacturing machine. A combining step combines the orientation and position of the mounting plate inside of the additive manufacturing machine and the position and top surface profile data of the parts to calculate a build path program for the additive manufacturing machine. A performing step performs a build process using the build path program to repair the parts.

In a second aspect, a computer-implemented method comprises a scanning step for scanning a mounting plate and a plurality of parts thereon with a profiler device to obtain position and orientation of the mounting plate and position and top surface profile data of the parts. A transmitting step transmits the position, the orientation and the top surface profile data to an additive manufacturing machine. An inserting step inserts the mounting plate and parts into the additive manufacturing machine in one operation. A detecting step detects orientation and position of the mounting plate inside of the additive manufacturing machine. A combining step combines the orientation and the position of the mounting plate inside of the additive manufacturing machine and the position and top surface profile data of the parts to calculate a build path program for the additive manufacturing machine. Subsequently, a build process is performed using the build path program to repair the parts.

In a third aspect, a non-transitory computer readable medium contains computer instructions stored therein for causing a computer processor to perform the following steps. A scanning step for scanning a mounting plate and a plurality of parts thereon with a profiler device to obtain position and orientation of the mounting plate and position and top surface profile data of the parts. A transmitting step for transmitting the position and the orientation of the mounting plate and the position and top surface profile data of the parts to an additive manufacturing machine. A detecting step detects orientation and position of the mounting plate inside of the additive manufacturing machine. A combining step combines the orientation and the position of the mounting plate inside of the additive manufacturing machine and the position and top surface profile data of the parts to calculate a build path program for the additive manufacturing machine. A performing step performs a build process using the build path program to repair the parts.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
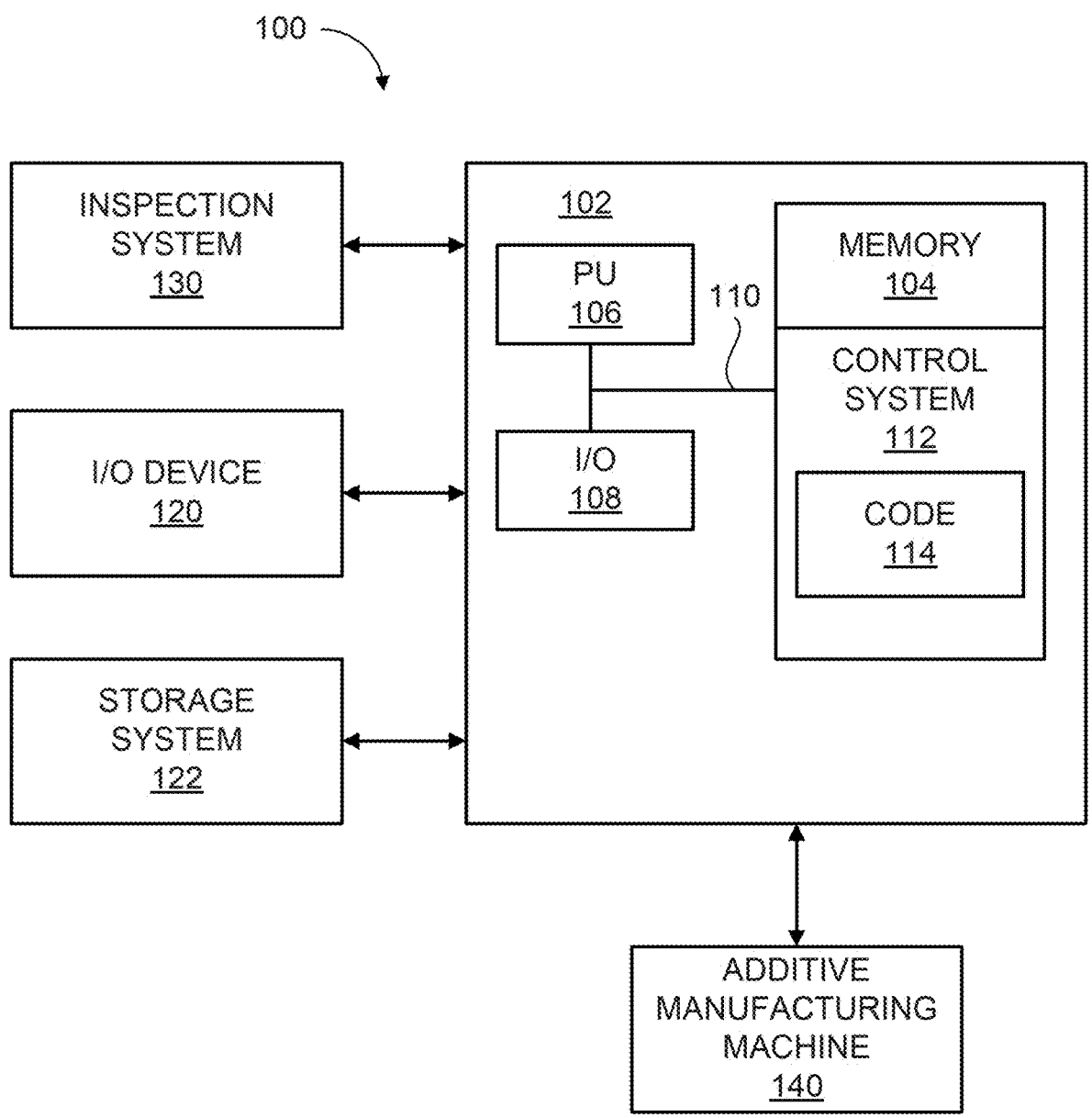
FIG. 1 shows a schematic drawing of a system for turbomachine airfoil erosion determination according to embodiments of the invention.

As indicated above, the disclosure provides for repair of machine parts or turbomachine parts (e.g., blades, buckets, nozzles, vanes, etc.). The teachings of the invention may be applied to any variety of machine or turbomachine including but not limited to a compressor, a gas turbine, a steam turbine, a jet engine, etc. In general terms, a system, method or program product according to embodiments of the disclosure attains a two-dimensional or three-dimensional profile of a part at a specified radial (or vertical) position on the part, e.g., by using a laser profiler. The position of the part (or multiple parts) on a mounting plate together with the orientation of the mounting plate are also detected outside of the build chamber of an additive manufacturing machine. The mounting plate with parts thereon are placed into the build chamber of the additive manufacturing machine. The part profiles and mounting plate orientation data are sent to a processor to compare part profile data to desired part profile data, and a build path program is calculated. The orientation and position of the mounting plate inside of the additive manufacturing machine is detected and combined with the build path program to obtain a finalized build path program. The build process then starts and multiple parts can be repaired or built-up together during one build cycle.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows a schematic drawing of a computer system 100 for turbomachine part repair using additive manufacturing. Computer system 100 performs the various process steps described herein for turbomachine part repair. In particular, a computing device 102 includes a memory 104, a processor (PU) 106, an input/output (I/O) interface 108, and a bus 110. Control system 112 is shown implemented on computing device 102 as computer program code, and the control system 112 executes code 114. Further, computing device 102 is shown in communication with an external I/O device/resource 120 and a storage system 122. As is known in the art, in general, processor 106 executes computer program code that is stored in memory 104 and/or storage system 122. While executing computer program code, processor 106 can read and/or write data, such as mounting plate position and/or orientation, and part profile data, to/from memory 104, storage system 122, and/or I/O device 120. Bus 110 provides a communications link between each of the components in computing device 102. I/O device 120 can comprise any device that enables a user to interact with computing device 102 or any device that enables computing device 102 to communicate with one or more other computing devices. Input/output devices (including but not limited to keyboards, displays, pointing devices, etc.) can be coupled to the system either directly or through intervening I/O controllers.

Computing device 102 can comprise any general purpose computing article of manufacture capable of executing computer program code installed by a user (e.g., a personal computer, server, handheld device, etc.). However, it is understood that computing device 102 is only representative of various possible equivalent computing devices that may perform the various process steps of the disclosure. To this extent, in other embodiments, computing device 102 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

System 100 may comprise two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As shown in FIG. 1, system 100 also includes an inspection system 130 and an additive manufacturing machine 140. The inspection system 130 includes a profiler device 230 (shown in FIG. 2) that obtains a top or outer surface profile of a part (e.g., a turbomachine part, such as blades, buckets, nozzles, vanes, etc.). The profiler device 230 may be a laser profiler or a structured light profiler device. A laser profiler device may include any laser measurement device capable of measuring a two-dimensional or three-dimensional profile of a part, or a tactile profiler device or any vision based profiling device which captures two or three dimensional data about an object/part. A structured light profiler projects a one or two-dimensional pattern of light (e.g., blue light or white light) onto the part surface and the distortion of the light pattern is used to detect the surface profile of the surface of the part. Example laser profilers may include a model DS1300 from Cognex or a model LJ-G200 from Keyence, but other laser profilers may also be employed. The inspection system 130 may be located external to the additive manufacturing machine 140, or inside the additive manufacturing machine.

Figure 2:
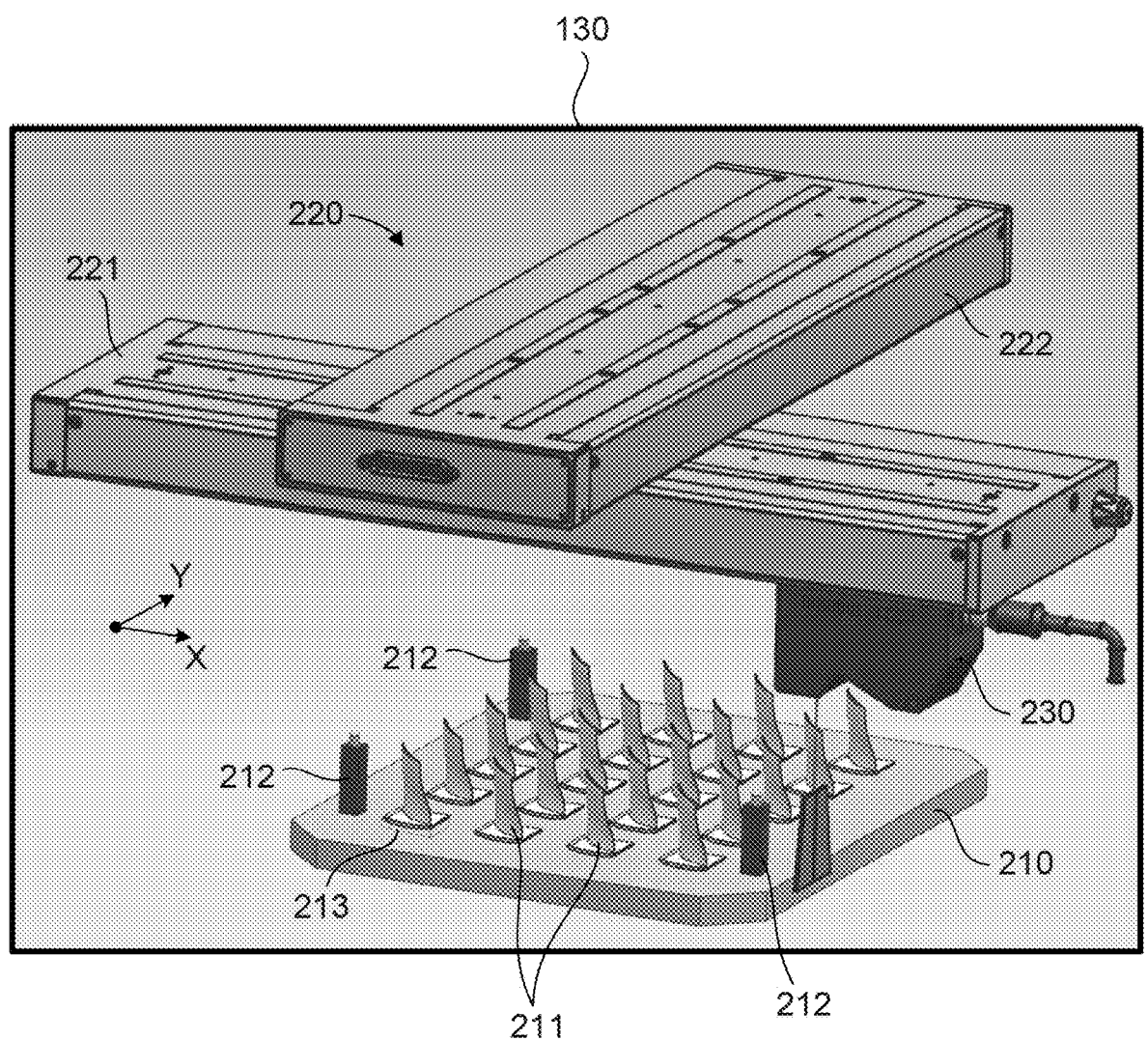
FIG. 2 shows a perspective view of a laser profiler of the system of FIG. 1 according to embodiments of the invention.
Figure 3:
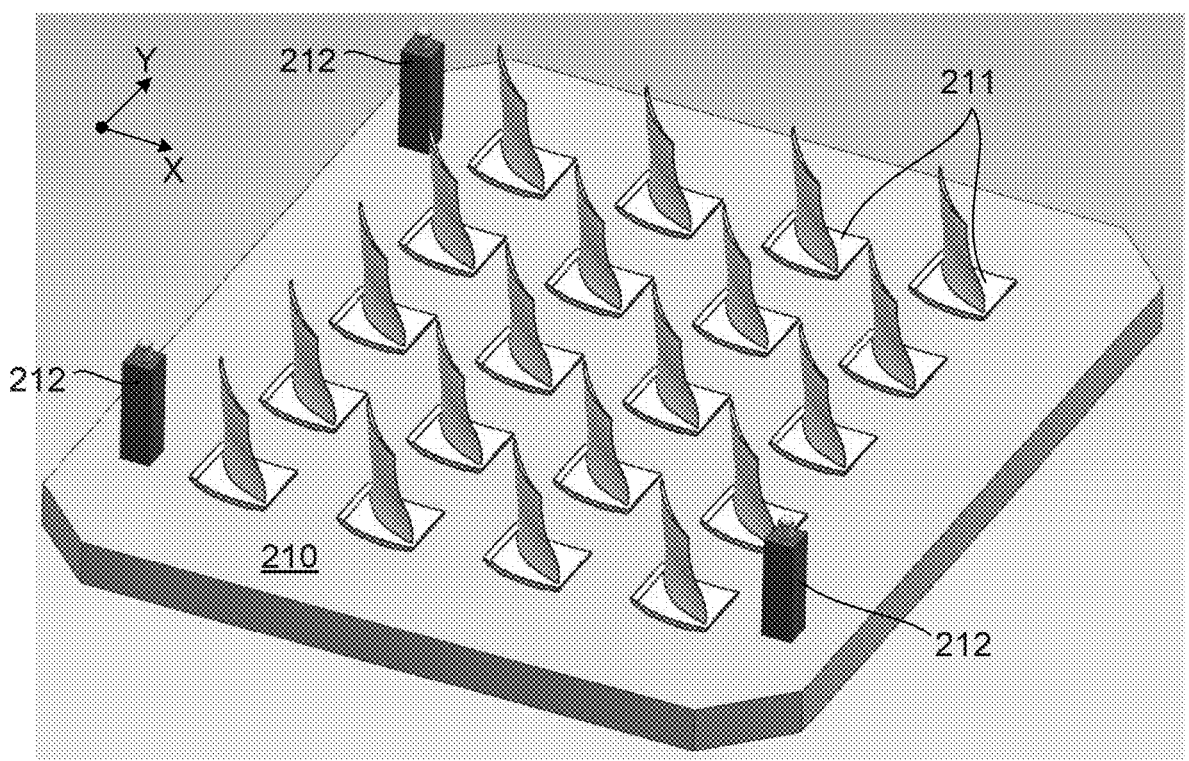
FIG. 3 illustrates a perspective view of the mounting plate with a plurality of parts mounted thereon.

FIG. 2 illustrates a simplified perspective view of a mounting plate 210, stage 220 and profiler device 230 of the inspection system 130. FIG. 3 illustrates a perspective view of the mounting plate 210 with a plurality of parts. The mounting plate 210 supports the parts 211, and includes a plurality of reference members 212. The mounting plate may include a plurality of mounting regions 213 that mount and securely retain each of the parts 211. Each mounting region 213 (only one of which is shown in FIG. 2) may be a recess (shown) formed in the mounting plate, or it may be a pattern of ridges that border the bottom periphery of the part 211. The parts 211 may also be secured to the mounting plate 210 via a suitable adhesive or magnetic mounting arrangement. The reference members 212 are located or arranged in an asymmetric pattern on the mounting plate 210, and this facilitates detection of mounting plate orientation (and position) by sensors/detectors in both the inspection system 130 and the additive manufacturing machine 140. In the example shown, there are three reference members 212 configured as pillars or posts. Each member 212 may have a target 214 affixed to the top thereof. The profiler device 230 may be used to detect the position of the reference members 212 and these positions are used to calculate the orientation of the mounting plate 210. The asymmetric pattern of the reference members 212 is important in that it permits any rotation (e.g., by 90 degrees or 180 degrees) of the mounting plate to be readily detected. However, the reference members 212 could be arranged in a symmetrical pattern if some or all of the reference members had different heights. For example, if two reference members on a left side of the mounting plate were longer than two reference members on the right side of the mounting plate, then orientation of the mounting plate could be detected. Alternatively, each reference member could have a different height. However, it is believed that having an odd number of asymmetrically located reference posts 212 (each having a predefined height) is the most elegant solution to detecting mounting plate 210 orientation and position. The reference members 212 are positioned so that the mounting plate position and orientation in 6-degrees of freedom (x, y, z and rotations around x, y and z) may be obtained. In some applications, three separate precise reference members will be enough to accomplish detection of mounting plate position and orientation in 6-degrees of freedom with known sizes, shapes and positions of the reference members.

The stage 220 may be a one, two or three-dimensional stage, and a two-dimensional stage is shown in FIG. 2. The two-dimensional stage includes an X stage 221 and a Y stage 222, where the X and Y directions/dimensions/axes are co-planer and orthogonal to each other. The profiler device 230 is mounted to the X stage 221, but it could be mounted to the Y stage 222 if the Y stage was placed below the X stage 221. The X stage 221 moves the profiler device back and forth along the X axis/dimension. As shown in FIG. 2, the X stage has the profiler device located at the far right edge of the mounting plate. The X stage 221 will then move the profiler device 230 to the left and as so it will scan the first row of parts 211, as well as the two reference posts 212. Subsequently, the Y stage 220 will shift the X stage 221 and profiler device 230 along the Y axis/dimension until it is aligned with the second row of parts, and the X stage is activated again to scan the next row of parts. In this manner, the two stages 221, 222 are used to scan each row of parts, as well as all of the reference posts. As mentioned previously, the profiler device 230 may be a laser profiler capable of measuring a two-dimensional or three-dimensional profile of a part. A structured light profiler projects a one or two-dimensional pattern of light (e.g., blue light or white light) onto the part surface and the distortion of the light pattern is used to detect the surface profile of the surface of the part. The profiler device 230 could also be configured to scan the entire mounting plate 210 and all the parts 211 thereon if the profiler device had a large enough field of view. In one aspect, the inspection system 130 is located external to the additive manufacturing machine 140. A spherical coordinate system can also be used to locate a position and orientation. A robotic arm (not shown) could be used to move and manipulate the profiler device 230, and the robotic arm may be a 6-axis robot, selective compliance articulated robot arm robot, delta robot, or another type of parallel kinematics device.

Figure 4:
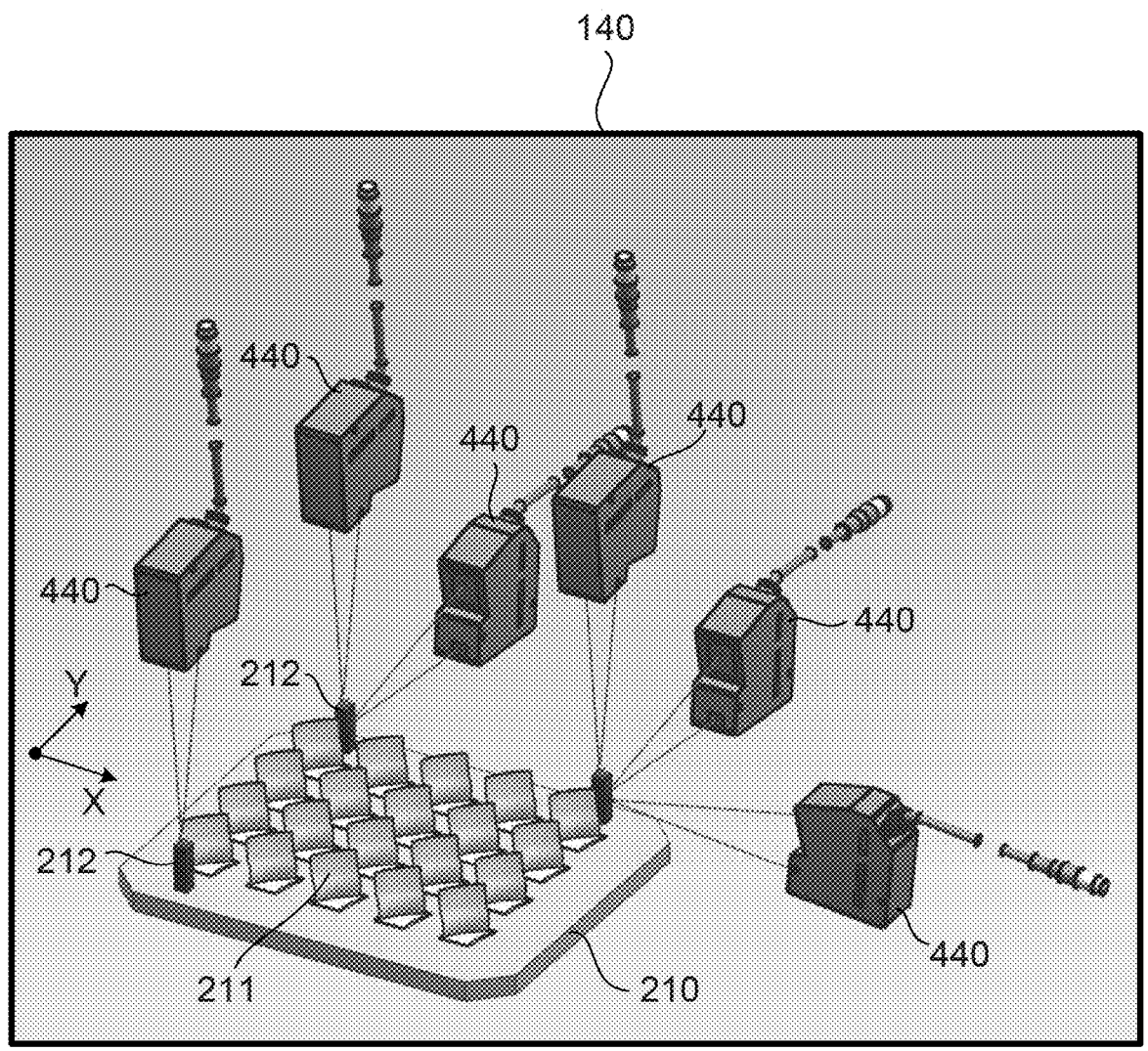
FIG. 4 illustrates a perspective view of the mounting plate and parts located in the additive manufacturing machine.

FIG. 4 illustrates a perspective view of the mounting plate 210 and parts 211 located in the additive manufacturing machine 140. The additive manufacturing machine 140 may be a selective laser melting (SLM) machine or a direct metal laser melting (DMLM) machine where metal powder layers are sequentially melted together to form the object, or any other suitable 3D printing or additive manufacturing machine. The additive manufacturing machine 140 includes a plurality of sensors 440 that detect the position and location of the reference member 212 (and from which the position and orientation of the mounting plate may be detected/calculated) when the mounting plate is inserted into the build chamber of the additive manufacturing machine 140. In one aspect, the sensors 440 are one-dimensional or linear displacement sensors that detect the distance to the reference member 212 from a known location. In the example shown in FIG. 4, three linear displacement sensors 440 are mounted above each expected reference member 212 location, and these sensors detect the vertical distance (along the Z axis) between each sensor 440 and the respective reference member 212. If these distances differ from a predetermined threshold, then it can be determined that the mounting plate is not in its expected orientation. As one example only, if two of the vertically spaced sensors detected a distance of 100 cm and a third detected a distance of 70 cm, then it would be determined that the third sensor was not over a reference member 212. Corrective action could then be taken to reposition the mounting plate to the desired orientation. Two sensors 440 are spaced from the mounting plate in the Y direction, and these sensors detect the distance to each reference member along the Y axis. Another sensor is spaced from the reference members in the X direction and this sensor detects the distance to a reference post along the X axis. In this example, the six sensors 440 are arranged so that the position of the mounting plate is obtained with six degrees of freedom, as well as the current orientation of the mounting plate. The current orientation of the mounting plate, as it is located inside the build chamber of the additive manufacturing machine, can be used in two ways. First, the mounting plate 210 may be moved or rotated into a desired position, if it is determined that the current position/orientation is not the desired position/orientation. Second, the current position/orientation of the mounting plate 210 and parts 211 located thereon are used by the processor to adjust the build path program of the additive manufacturing machine 140. In some applications three sensors 440 may be sufficient to obtain the desired degree of positional accuracy. For example, a calibrated camera located to view from the top of the build chamber can collect image data from a pattern on a surface and calculate the position and orientation. Also, the number of sensors and various equipment devices will be different based on the specific method used.

Figure 5:
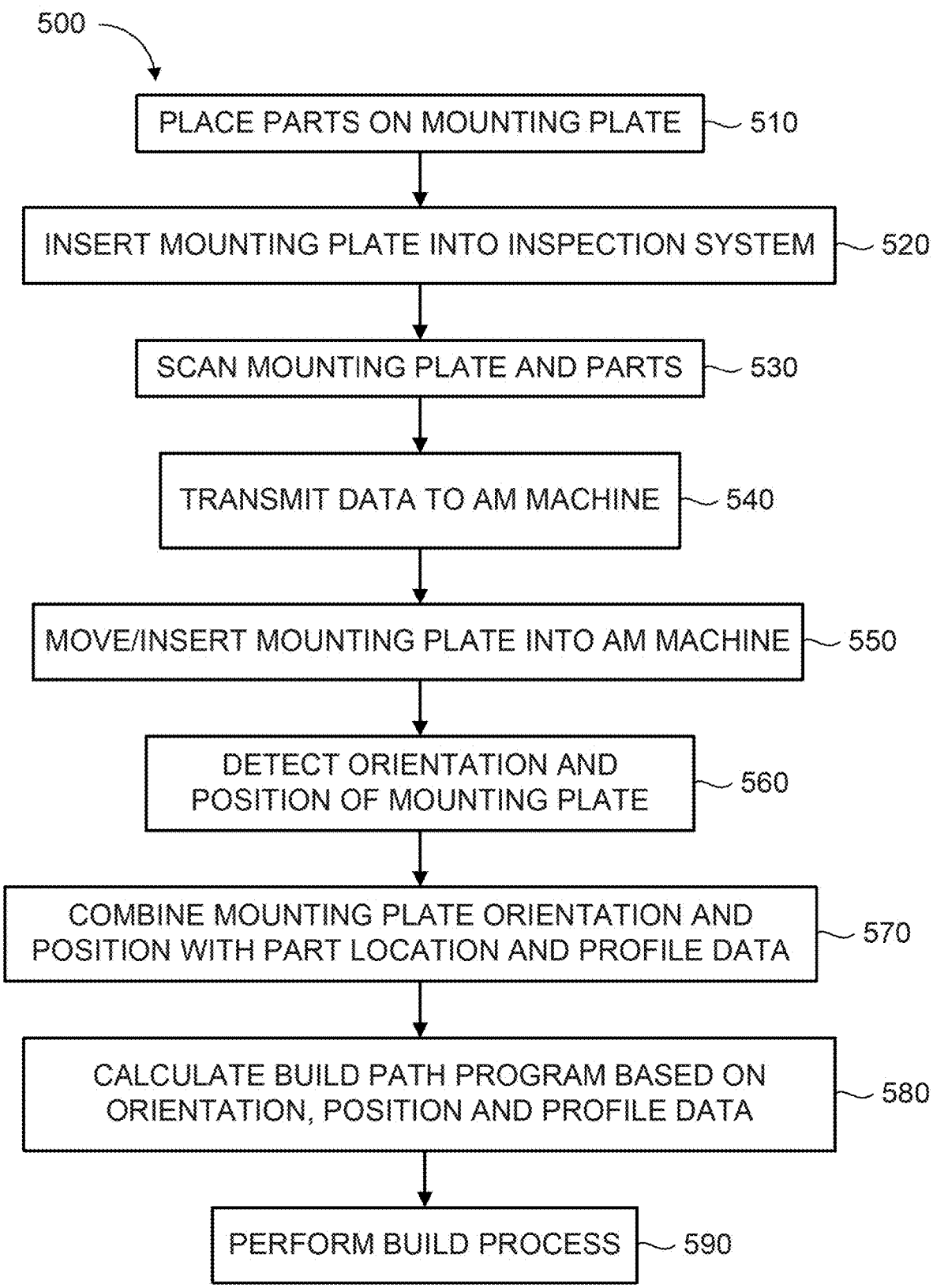
FIG. 5 is a flowchart of a computer-implemented method for turbomachine part repair using additive manufacturing.

FIG. 5 is a flowchart of a computer-implemented method 500 for turbomachine part repair using additive manufacturing. A placing step 510 places parts 211 on a mounting plate 210, and this placing step may be performed manually or by robotic means. An inserting step 520 inserts the mounting plate 210 and parts 211 located thereon into the inspection system 130, and this inserting step may also be performed manually or by robotic means. A scanning step 530 scans the mounting plate 210 and the parts 211 with a profiler device 230 to obtain position and orientation of the mounting plate relative to the top surface profile data of each part. In this step the position and orientation of the mounting plate is detected by scanning a plurality of reference members 212. The reference members 212 may be a plurality of posts having predefined heights. In a preferred aspect, multiple parts are located on the mounting plate and the multiple parts are scanned in a single scanning operation, however the method could be used for single parts as well. The scanning step 530 is controlled or implemented by a computer or processor. A transmitting step 540 transmits the position and orientation data of the mounting plate and the top surface profile data of the parts to an additive manufacturing machine or a computer or processor. A moving step 550 moves the mounting plate 210 and parts 211 and inserts both into the additive manufacturing machine 140, and the parts 211 are preferably not moved from their original location on the mounting plate. This moving step 550 may be performed manually or by robotic means. In step 560, the orientation and position of the mounting plate inside of the additive manufacturing machine is detected, and this is accomplished with a plurality of sensors 440. It is important that the position of the parts do not change relative to the mounting plate, as the relationship between mounting plate position/orientation and part location and top surface profile has already been established with step 530. In step 570, the position and orientation of the mounting plate and the location and top surface profile of the parts is combined inside of the additive manufacturing machine to calculate a build path program for the additive manufacturing machine. The build path program will specify how each part will be built up with material to repair damage to each individual part. In most cases, each part will have different damage and will require a different repair. The scanning, detection and calculation of the mounting plate, parts located thereon and mounting plate location/orientation inside of the build chamber of the additive manufacturing machine are all used by the processor/computer to customize the build path program for each individual part. In addition to calculating or customizing the build path, the processor/computer can offset an existing build path to the detected location of parts to match the first layer of additive manufacturing with the top surface of the parts. In step 590 the build path program or process is performed to repair the parts. An advantage to this method is that multiple parts (each with different types of damage) can be repaired simultaneously in the same build cycle of the additive manufacturing machine.

The system and method described herein provides the technical advantage of improving computer technology, computer functionality and/or additive machine functionality and efficiency. A plurality of parts can be scanned and position and profile data is obtained in one scanning operation. The part position and profile data is matched to a position and orientation of a mounting plate upon which the parts are located. This scanning operation is performed outside of (or external to) the additive manufacturing machine, so currently available additive manufacturing machines may be used with the system and method herein described. The volume of the build chamber in the additive manufacturing machine is also not reduced for the scanning components. After scanning, the mounting plate and parts located thereon are moved and inserted into the build chamber of the additive manufacturing machine. The relative position of the parts to the mounting plate has not changed. The additive manufacturing machine now only needs to detect the position and orientation of the mounting plate to calculate a specific build path program for each part. The result is that multiple parts can be simultaneously repaired increasing and improving additive machine part output and efficiency.

As used herein, various systems and components are described as "receiving", "obtaining" or "transmitting" data (e.g., two-dimensional profiles of the turbomachine parts, etc.). It is understood that the corresponding data can be obtained or sent using any solution. For example, the corresponding system/component can generate and/or be used to generate the data, retrieve the data from one or more data stores (e.g., a database) or measurement devices (e.g., profiler device 230), receive the data from another system/component, transmit the data to another system/component and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A system comprising:
a mounting plate having a plurality of reference members;
an inspection system having a profiler device;
an additive manufacturing machine operatively coupled with the inspection system, the additive manufacturing machine including a build chamber;
a computer device configured to perform the steps of:
scanning the mounting plate with the profiler device outside of the build chamber of the additive manufacturing machine to obtain position and orientation of the reference members and position and top surface profile data of any parts located on the mounting plate;
transmitting the position and orientation of the reference members and the position and top surface profile data of the parts to the additive manufacturing machine;
detecting orientation and position of the mounting plate after the mounting plate has been placed inside of the build chamber of the additive manufacturing machine;
combining the orientation and position of the mounting plate obtained inside of the build chamber of the additive manufacturing machine and the position and top surface profile data of the parts obtained outside of the build chamber of the additive manufacturing machine to calculate a build path program for the additive manufacturing machine; and
performing a build process inside of the build chamber of the additive manufacturing system using the build path program to repair the parts.

2. The system of claim 1, wherein the reference members are located in an asymmetric pattern on the mounting plate.

3. The system of claim 1, wherein the reference members comprise a plurality of posts having predefined heights.

4. The system of claim 1, the mounting plate further comprising a plurality of mounting regions for mounting and securely retaining the parts.

5. The system of claim 1, wherein the profiler device is a two-dimensional profiler device mounted to a two-dimensional stage, the two-dimensional stage configured to move the two-dimensional profiler device over the mounting plate in two orthogonal dimensions.

6. The system of claim 5, wherein the two-dimensional profiler device is one of:
a laser profiler, or a structured light profiler.

7. The system of claim 1, the additive manufacturing machine comprising a plurality of linear displacement sensors for detecting the position and the orientation of the mounting plate inside of the additive manufacturing machine.

8. The system of claim 7, wherein there are at least three linear displacement sensors so that the position of the mounting plate is obtained with six degrees of freedom.

9. A computer-implemented method comprising:
scanning a mounting plate and a plurality of parts thereon outside of a build chamber of an additive manufacturing machine with a profiler device to obtain position and orientation of the mounting plate and position and top surface profile data of the parts;
transmitting the position, the orientation and the top surface profile data to the additive manufacturing machine;
inserting the mounting plate and parts into the build chamber of the additive manufacturing machine;
detecting orientation and position of the mounting plate after the mounting plate has been placed inside of the build chamber of the additive manufacturing machine;
combining the orientation and the position of the mounting plate obtained inside of the build chamber of the additive manufacturing machine and the position and top surface profile data of the parts obtained outside of the build chamber of the additive manufacturing machine to calculate a build path program for the additive manufacturing machine; and
performing a build process inside of the build chamber of the additive manufacturing system using the build path program to repair the parts.

10. The method of claim 9, wherein the mounting plate comprises a plurality of reference members located in an asymmetric pattern on the mounting plate, and the scanning step determines the position and the orientation of the mounting plate by scanning the reference members.

11. The method of claim 10, wherein the reference members have predefined heights.

12. The method of claim 10, the mounting plate further comprising a plurality of mounting regions for mounting and securely retaining the parts.

13. The method of claim 10, wherein the profiler device is a two-dimensional profiler device mounted to a two-dimensional stage, the two-dimensional stage moving the two-dimensional profiler over the mounting plate in two orthogonal dimensions.

14. The method of claim 13, wherein the two-dimensional profiler device is one of:
a laser profiler, or a structured light profiler.

15. The method of claim 9, wherein the detecting step is performed with a plurality of linear displacement sensors that detect the position and the orientation of the mounting plate inside of the additive manufacturing machine.

16. The method of claim 15, wherein there are at least six linear displacement sensors so that the position of the mounting plate is obtained with six degrees of freedom.

17. The method of claim 9, wherein the parts are turbomachine parts.

18. A non-transitory computer readable medium containing computer instructions stored therein for causing a computer processor to perform the following steps:
scanning a mounting plate and a plurality of parts thereon outside of a build chamber of an additive manufacturing machine with a profiler device to obtain position and orientation of the mounting plate and top surface profile data of the parts;
transmitting the position, the orientation and the top surface profile data to the additive manufacturing machine;
detecting orientation and position of the mounting plate after the mounting plate has been placed inside of the build chamber of the additive manufacturing machine;
combining the orientation and the position of the mounting plate obtained inside of the build chamber of the additive manufacturing machine and the top surface profile data obtained outside of the build chamber of the additive manufacturing machine to calculate a build path program for the additive manufacturing machine; and
performing a build process inside of the build chamber of the additive manufacturing system using the build path program to repair the parts.

* * * * *